(12) United States Patent
Mai

(10) Patent No.: US 6,900,857 B2
(45) Date of Patent: May 31, 2005

(54) ASSEMBLY STRUCTURE FOR FLAT PANEL DISPLAY

(75) Inventor: Che-Kuei Mai, Hsinchu (TW)

(73) Assignee: Toppoly Optoelectronics Corp. (TW)

(*) Notice: Subject to any disclaimer, the term of this patent is extended or adjusted under 35 U.S.C. 154(b) by 65 days.

(21) Appl. No.: 10/440,266

(22) Filed: May 19, 2003

(65) Prior Publication Data
US 2004/0080683 A1 Apr. 29, 2004

(30) Foreign Application Priority Data
Oct. 29, 2002 (TW) .................... 91217330 U

(51) Int. Cl.[7] ............................................... G02F 1/13
(52) U.S. Cl. ........................................................ 349/58
(58) Field of Search ............................................ 349/58

(56) References Cited

U.S. PATENT DOCUMENTS 5,233,502 A * 8/1993 Beatty et al. ............... 361/681

* cited by examiner

Primary Examiner—James A. Dudek
(74) Attorney, Agent, or Firm—Lowe Hauptman & Berner, LLP

(57) ABSTRACT

An assembly structure for flat panel display includes a housing with a skid structure therein to fit the flat panel display, a connector with a male portion and a female portion mounted on the flat panel display and a system mainboard on the housing respectively.

11 Claims, 4 Drawing Sheets

ASSEMBLY STRUCTURE FOR FLAT PANEL DISPLAY

BACKGROUND OF THE INVENTION

1. Field of the Invention

The present invention generally relates to an assembly structure for flat panel display, and more particularly to the assembly structure for flat panel display using house with skid.

2. Description of the Prior Art

Liquid crystal display device, which is a par flat display device, is a kind of household electric appliance in nowadays daily life, such as television or monitor of a computer, display device on a calculator, display screen of watch or mobile phone, display device of controlling system, or display panel of CD player. Application of liquid crystal display device is so wildspread, so assembly between electrical devices is very important. Most liquid crystal display devices are electrically connected to system mainboards via flexible printed circuit board, in which there are control devices for controlling liquid crystal display devices on the system mainboards. System mainboards have circuits layout on a printed circuit board, and control devices which are IC (integrated circuits) chip fabricated by semiconductor process are connected to system mainboards.

Referring to FIG. 1, a flexible printed circuit board 102 is around peripheral of a liquid crystal display device 100. One end of the flexible printed circuit board 102 is electrically connected to pins of the liquid crystal display device 100, and another end will electrically connected to a system mainboard 104, as shown in FIG. 2. The liquid crystal display device 100 includes a liquid crystal display panel 110 and a backlight plate 120, wherein the liquid crystal display panel 110 has a lower transparent substrate 112, a liquid crystal layer 114 on the lower transparent substrate 112, and an upper transparent substrate 116 on the liquid crystal layer 114. The backlight plate 120 has a light guide plate 122 and a light source 124 on one end surface thereof. This kind of backlight plate 120 used in the liquid crystal display device 100 is now most useful transparent type of liquid crystal display device. One end of the flexible printed circuit board 102 is electrically connected to the lower transparent substrate 112, and another end is electrically connected to the system main board 104 by using connector 108. The advantage of using flexible printed circuit board can be shown in FIG. 2, because assembled volume of liquid crystal display device can be reduced substantially.

The assembly structure of liquid crystal display device can be shown in many documents and patents in every country, for example, U.S. Pat. No. 5,844,733 introducing assembles of liquid crystal display device in a laptop computer. U.S. Pat. No. 6,181,404 introduces a rigid connector used for a system mainboard and liquid crystal display device. TW patent 476,122 shows a method for assembling flat display device with an opaque substrate, wherein liquid crystal display panel, printed circuit board, and heat sink are connected with each other. TW Patent 422,933, which belongs to Samsung, shows liquid crystal display module with printed circuit board. TW patent 448,337, which belongs to Seiko-Epson, introduces a flexible clip adapter to connect input end and driving circuits.

Another method for connecting liquid crystal display device and control device of system mainboard is to form control chip on the lower substrate of a liquid crystal display device directly by using semiconductor manufacturing process, which is called COG (chip on glass) process. A typical COG process can be shown in U.S. Pat. No. 6,292,248. Although this process can reduce thickness of display, however, such advance and complex process has high cost and low yield in mass production.

However, electric appliance used in daily life must go toward to minimized volume, but the above mentioned assemble structure method is hard to achieve minimized volume. Hence, we need another method to reduce volume and weight of display.

SUMMARY OF THE INVENTION

In accordance with the present invention, an assembly structure for a flat display device is provided.

It is another object of this invention that a skid structure is used in housing to install flat display convenient.

It is a further object of this invention that a connector is used for connecting flat display device and system mainboard to assemble and disassemble thereof fast.

It is still another object of this invention that gold finger structures and slot structures are used for connection between flat display device and system mainboard to assemble and disassemble thereof fast.

It is still further object of this invention that flexible printed circuit board is omitted in conventional liquid crystal display device to reduce thickness and weight thereof.

In one embodiment, an display device assembly comprises a flat display device having four side surfaces and being provided with a first interface connector on one of the side surfaces; and a housing for receiving said flat display device, being formed as a U shape having three inner surfaces, and being provided with a second interface connector exposed to one inner surface at a bottom side of the U shape to match with the first interface connector, two skids on two inner surfaces at two sides of the U shape to guide the flat display device to slide into the housing, and a system main board allocated at the bottom side of the U shape and built with the second interface connecter thereon.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

This invention provides a flat display device structure which comprises a flat display device, a housing with a system mainboard therein and a skid to receive said flat display device, and a first connector and a second connector electrically connecting thereto when the flat display device is assembled into the housing through the skid, wherein the first connector is mounted on the flat display device and the second connector is mounted on the system mainboard.

The flat display device is reflective liquid crystal display device, and the assembly structure of the flat display device comprises a touch panel on the liquid crystal display device. The first connector is welded on the flat display device and the second connector is welded on the system mainboard.

The first connector can have a gold finger structure, and the second connector is then a slot structure and welded on the system mainboard. The assembly structure of flat display device includes a cover to fix the flat display device, and the housing has a fixing hole to fix the cover.

Figure 1:
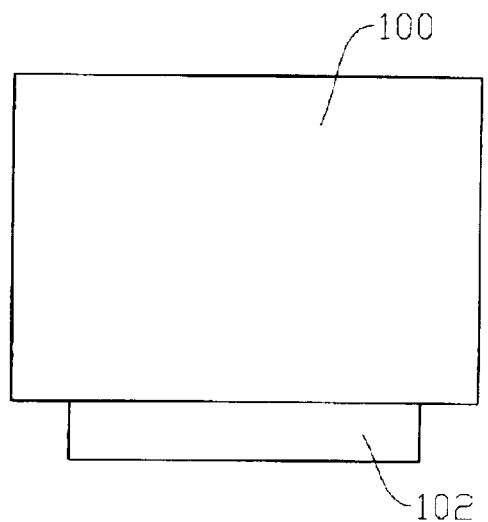
FIG. 1 illustrates a schematic representation of conventional structure of liquid crystal display device and flexible printed circuit board.
Figure 2:
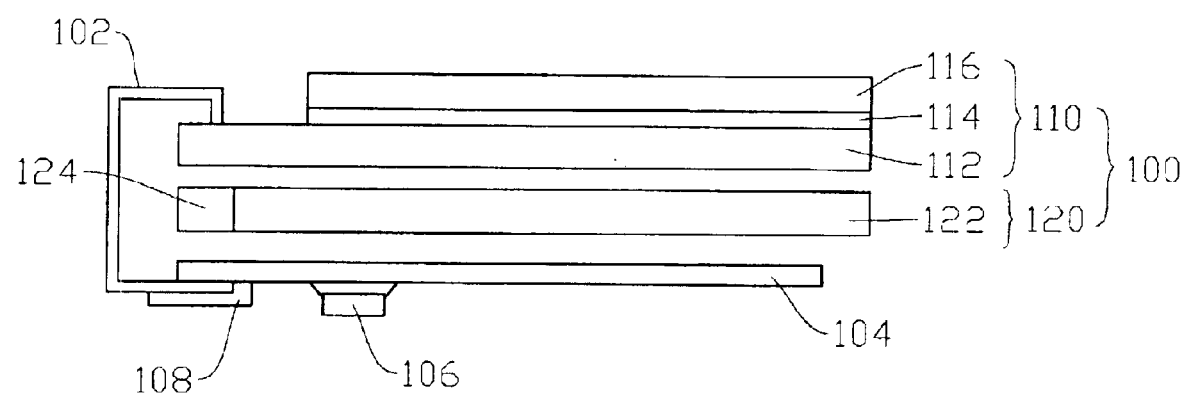
FIG. 2 illustrates a schematic representation of conventional structure of liquid crystal display device and system mainboard.
Figure 3:
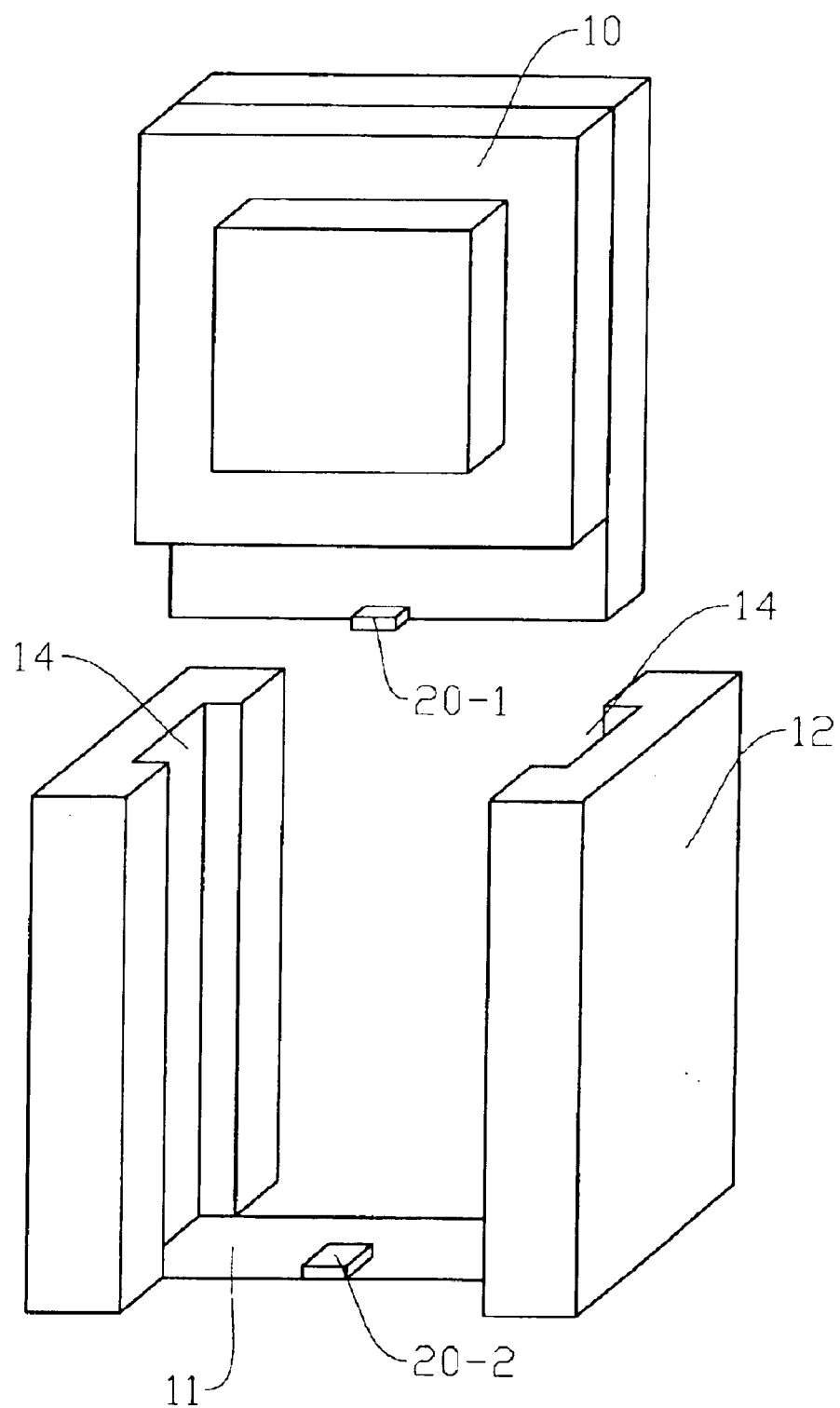
FIG. 3 shows a schematic representation of assembly structure for flat display device according to this invention.

Next, a preferred embodiment of assembly structure if flat display device according to this invention is set forth. Referring to FIG. 3, a housing 12 has a set of skid 14 inside the housing 12 to fit a flat display device 10, such as liquid crystal display device. At the bottom of the housing 12, a system mainboard 11 has circuits and controller for controlling the flat display device 10, a set of connector 20, has a first connector 20-1 and a second connector 20-2, mounted on the flat display device 10 and system mainboard 11 respectively. The first connector 20-1 is always a male portion of the connector 20, and the second connector 20-2 is always a female portion of the connector 20. Installation of the first and second connectors 20-1, 20-2 is welded on the flat display device 10 and the system mainboard 11 respectively. When the flat display device 10 is put into the housing 12 through skid 14, the connector 20 can electrically connect with each other such that the controller and circuits on the system mainboard 11 can drive the flat display device 10.

Figure 4:
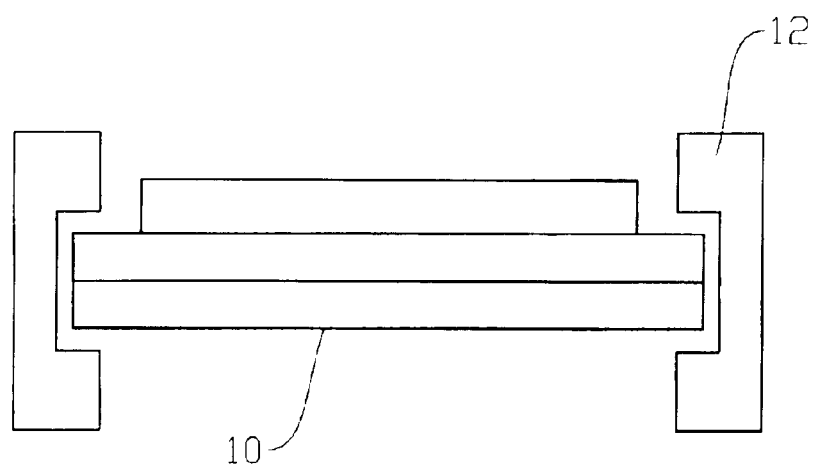
FIG. 4 illustrates a schematic representation of top view of an embodiment in FIG. 3.

Referring to FIG. 4, a top view illustrates the flat display device out into the housing 12. The skid 14 in the housing 12 should be custom-made according to the side size of flat display device 10 to be fixed in the housing 12. Turning back to FIG. 3, size of the housing 12 should fasten the flat display device 10, so length of skid 14 preferred to about equal to side length of the flat display device 10.

The flat display device 10 in this embodiment usually uses liquid crystal display device which comprises display panel and light source. For example, liquid crystal display devices with back light source or front light source can be applied to this invention. Moreover, a touch panel can be also used and located on the liquid crystal display device. Sizes of housing 12 and skid 14 are only to be considered to fit whole flat display device with touch panel.

Material of housing should be firm and solid, preferable insulating material, such as plastic, rubber, or other similar material.

Figure 5:
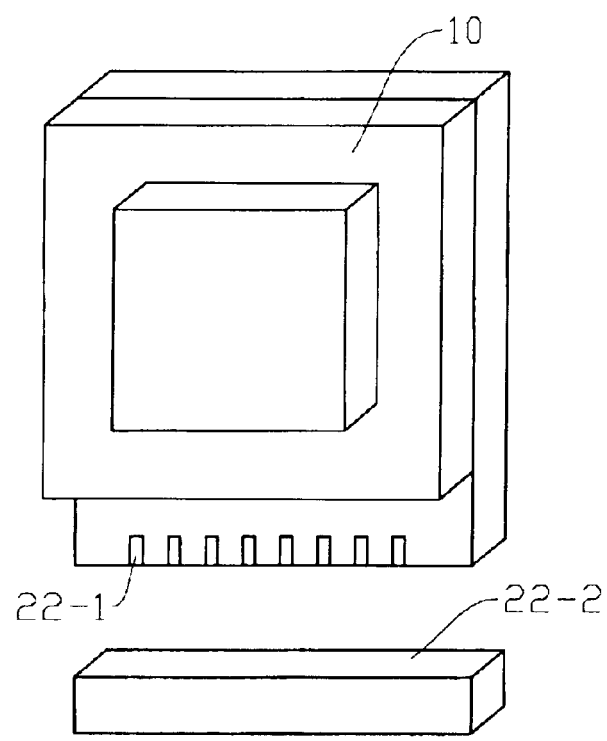
FIG. 5 illustrates another schematic representation of assembly structure for flat display device according to this invention.

The first connector 20-1 mounted on the flat display device 10, as shown in FIG. 3, can be designed as gold finger structure, as shown in FIG. 5, while the second connector 20-2 mounted on the system mainboard 11 now becomes slot structure. When the flat display device 10 installed into the housing 12, connection between flat display device 10 and system mainboard 11 will be as easy as like add-on card installed into slot structure, or memory card installed into bank slot. Another advantage of the gold finger structure 22-1 is that many pins can be designed, especially for liquid crystal display device with extremely large number of electrodes. The gold finger structure 22-1 can satisfy such requirement. If the connector 20, as shown in FIG. 3, is used in this invention, more than one connector are necessary when one connector can not provide enough electric connection for the flat display device 10. Furthermore, the gold finger structure 22-1 can omit step of installation or welding the first connector 20-1, as shown in FIG. 3, to the flat display device 10.

Figure 6:
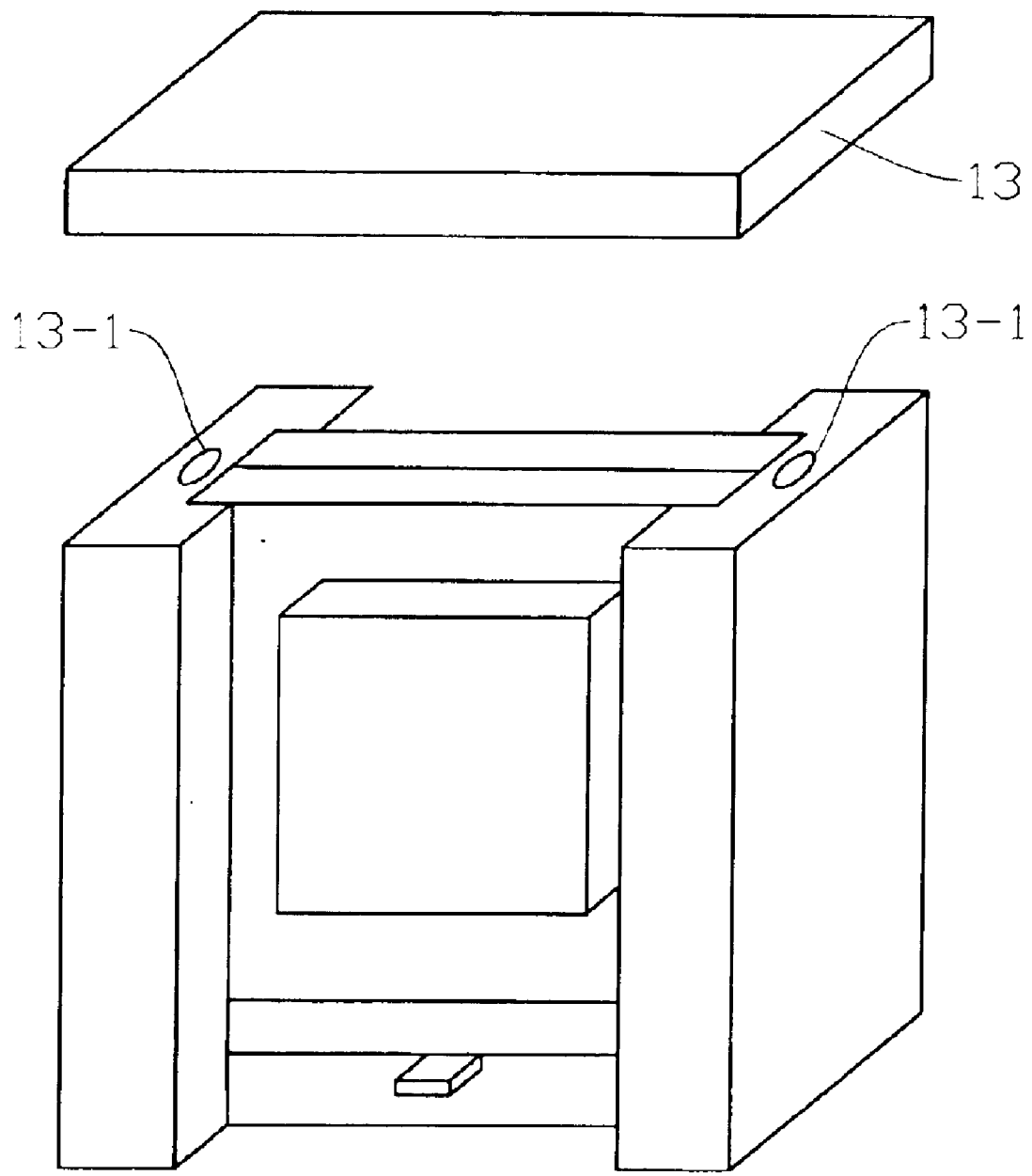
FIG. 6 illustrates a schematic representation of a cover to fix flat display device.

Referring to FIG. 6, a cover 13 is designed to fix or fasten the flat display device 10 after flat display device 10 is put into the housing. At least one fixing hole 13-1 is located on the housing 12 to fix or fasten the cover 13.

This invention makes use of housing with skid structure and by means of connector such that flat display device and system mainboard can be assembled or disassembled fast and easily. Moreover, using of gold finger structure and slot as connection tools for flat display device and system mainboard can also be assembled or disassembled fast and easily. Further, omitted flexible printed circuit board in conventional liquid crystal display device can reduce thickness and weight and increase integrity.

Although specific embodiments have been illustrated and described, it will be obvious to those skilled in the art that various modifications may be made without departing from what is intended to be limited solely by the appended claims.

What is claimed is:

1. A display device assembly, comprising:
   a flat display device having four side surfaces and being provided with a first interface connector on one of the side surfaces; and
   a housing for receiving said flat display device, being formed as a U shape having three inner surfaces, and being provided with a second interface connector exposed to one inner surface at a bottom side of the U shape to match with the first interface connector, two skids on two inner surfaces at two sides of the U shape to guide the flat display device to slide into the housing, and a system main board allocated at the bottom side of the U shape and built with the second interface connector thereon.

2. The display device assembly according to claim 1, wherein said flat display device is a reflective liquid crystal display device.

3. The display device assembly according to claim 1, further comprising a touch panel on a panel of said liquid crystal display device.

4. The display device assembly according to claim 1, wherein said first connector is a gold finger structure.

5. The display device assembly according to claim 4, wherein said second connector is a slot structure.

6. The display device assembly according to claim 5, wherein said second connector is welded to said system mainboard.

7. The display device assembly according to claim 1, wherein said first connector is welded to said flat display device.

8. The display device assembly according to claim 7, wherein said second connector is welded to said system mainboard.

9. The display device assembly according to claim 1, further comprising a cover to fix said flat display device.

10. The display device assembly according to claim 9, wherein said housing comprises a fixing hole to fix said cover.

11. The display device assembly according to claim 1, wherein said housing comprises two skids.

* * * * *